United States Patent [19]

Kaneko et al.

[11] 4,020,280
[45] Apr. 26, 1977

[54] PULSE WIDTH LUMINANCE MODULATION SYSTEM FOR A DC GAS DISCHARGE DISPLAY PANEL

[76] Inventors: Ryuichi Kaneko, No. 5956, Ikuta, Tama, Kawasaki; Minori Yokozawa, No. 7-1, 5-chome, Misono, Sagamihara; Shigemitsu Suzuki, No. 5280, Higashi-Shinozaki, Edogawa, Tokyo; Takeo Kamegaya, No. 10-14, 3-chome, Kyodo, Setagaya, Tokyo, all of Japan

[22] Filed: Feb. 20, 1974

[21] Appl. No.: 444,017

[30] Foreign Application Priority Data

Feb. 21, 1973 Japan .............................. 48-20263
Nov. 2, 1973 Japan ............................ 48-122936

[52] U.S. Cl. .................. 358/242; 315/169 TV
[51] Int. Cl.² ...................................... H04N 3/00
[58] Field of Search ............ 178/7.3 D; 340/324 M; 315/169 TV

[56] References Cited

UNITED STATES PATENTS

| | | | |
|---|---|---|---|
| 2,233,876 | 3/1941 | Skellett | 178/7.3 R |
| 3,601,531 | 10/1968 | Bitzer et al. | 178/7.3 D |
| 3,627,924 | 12/1971 | Fleming et al. | 178/7.3 D |
| 3,714,374 | 1/1973 | Sobel | 178/7.3 D |
| 3,733,435 | 5/1973 | Chodil et al. | 315/169 TV |
| 3,752,910 | 8/1973 | Lewis | 178/7.3 D X |
| 3,761,617 | 9/1973 | Tsuchiya et al. | 315/169 TV |
| 3,786,485 | 1/1974 | Wojick | 340/324 M |
| 3,800,186 | 3/1974 | Yamane et al. | 178/7.3 D |
| 3,801,862 | 4/1974 | Skutt | 315/169 TV |
| 3,801,864 | 4/1974 | Yamane et al. | 178/7.3 D |
| 3,838,209 | 9/1974 | Tsuchiya et al. | 178/7.3 D |

*Primary Examiner*—Robert L. Griffin
*Assistant Examiner*—Aristotelis M. Psitos

[57] ABSTRACT

A pulse width luminance modulation system for driving a gas discharge panel in line at a time. The driving circuit for the discharge cell comprises a CR time constant element in order to enlarge the contrast range of the picture to be displayed. The discharge cell is caused to produce glow discharge when the pulse width of the pulse width modulation driving pulse is wider than a certain value depending on the CR time constant to produce normal pulse width luminance modulation of the glow discharge, and the discharge cell is caused to produce instantaneous irradiation of which the intensity is dependent on a stored charge in the capacitive element C of the CR element when the driving pulse width is narrower than the certain value so as to widen the low luminance range and by suitably selecting the value of the CR element for obtaining continuity of the two luminance characteristics, and further the input signal for making luminance modulation is applied with a correction in order to make the $\gamma$ value of the luminance characteristic of the discharge cell a close approximation to that of a cathode ray tube after converting the input signal to a pulse code modulated signal for obtaining an easy $\gamma$ correction in the low luminance range.

9 Claims, 38 Drawing Figures

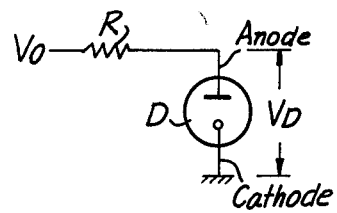
FIG_1a
PRIOR ART
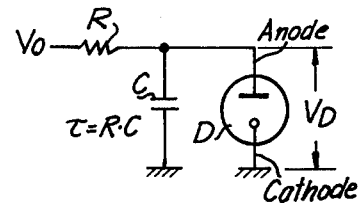
FIG_1b
PRIOR ART
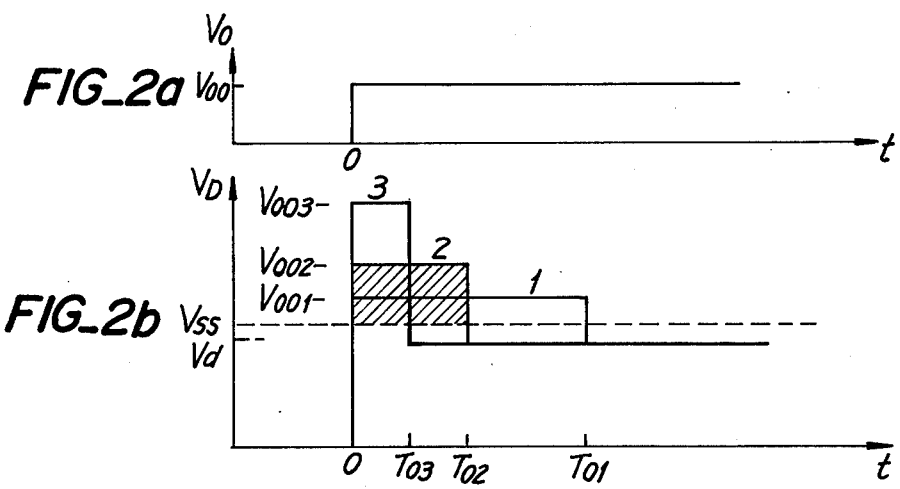
FIG_2a
FIG_2b
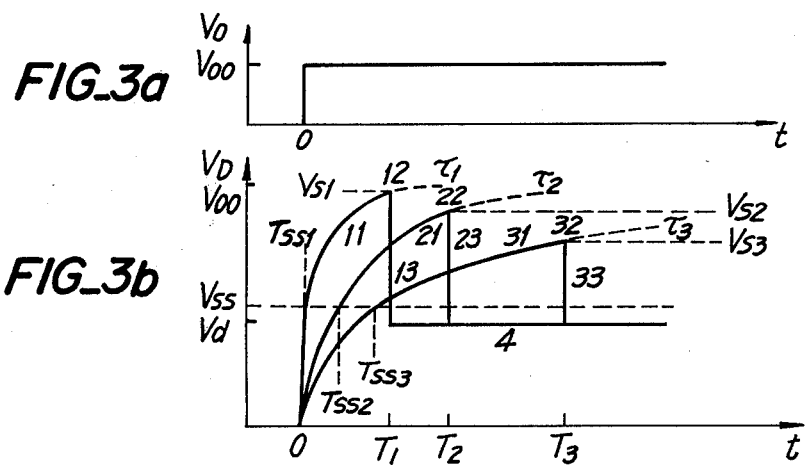
FIG_3a
FIG_3b

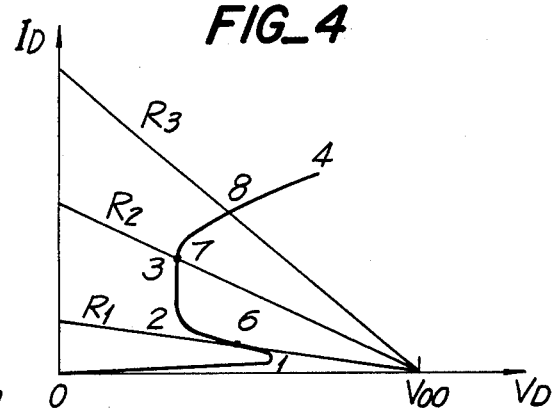
FIG_4
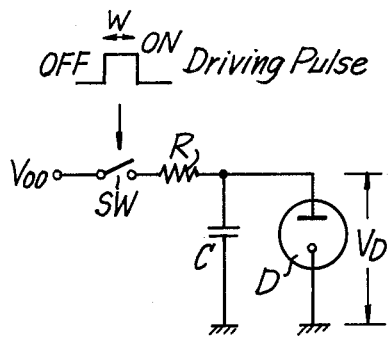
FIG_5a
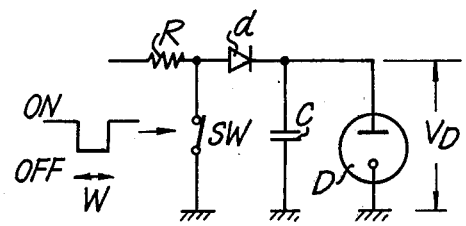
FIG_5b
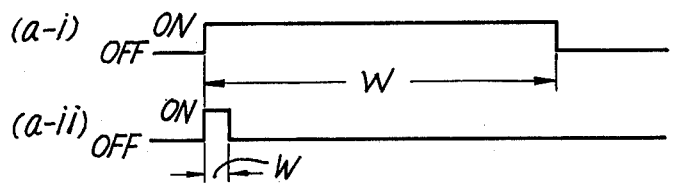
FIG_6a
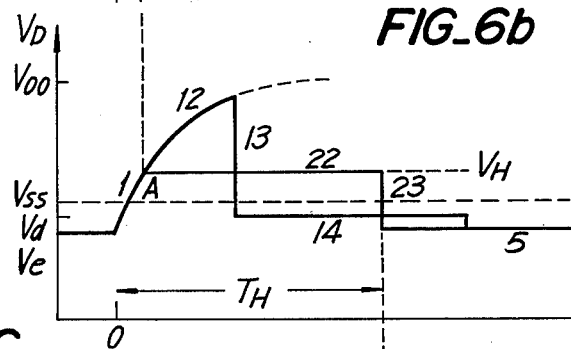
FIG_6b
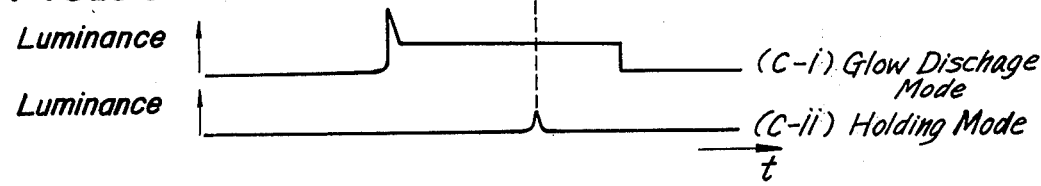
FIG_6C

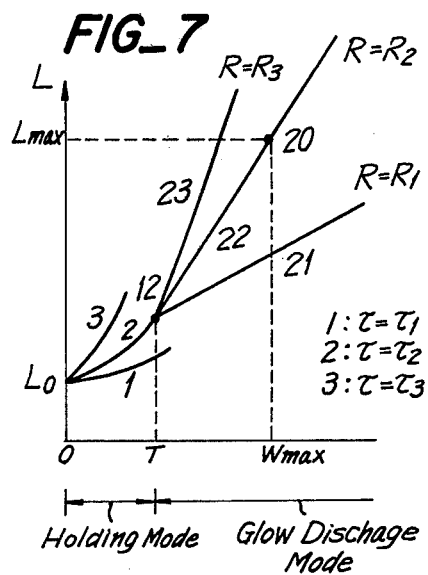
FIG_7
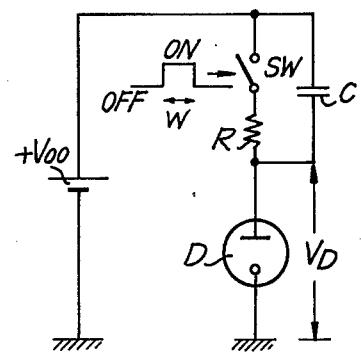
FIG_8
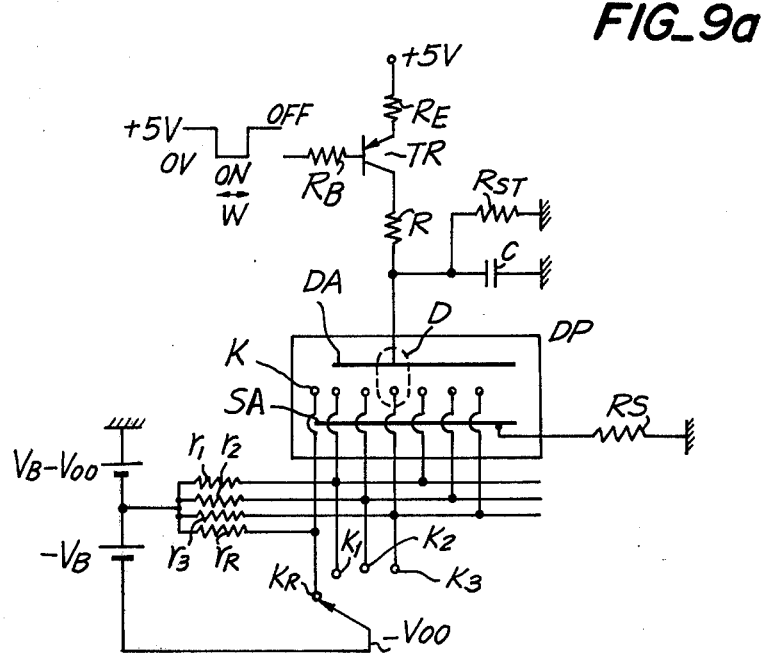
FIG_9a
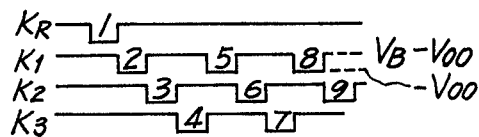
FIG_9b

FIG_10
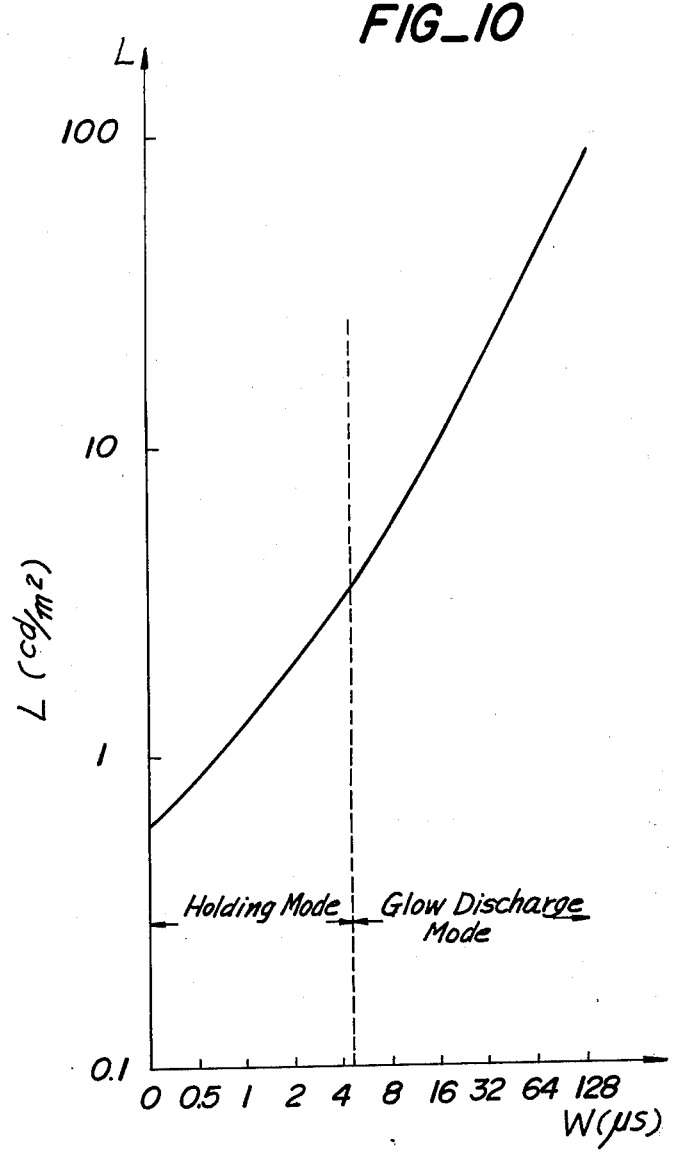
FIG_11
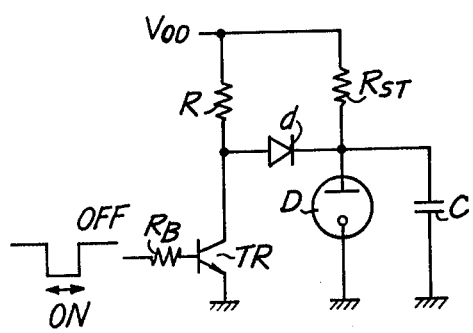

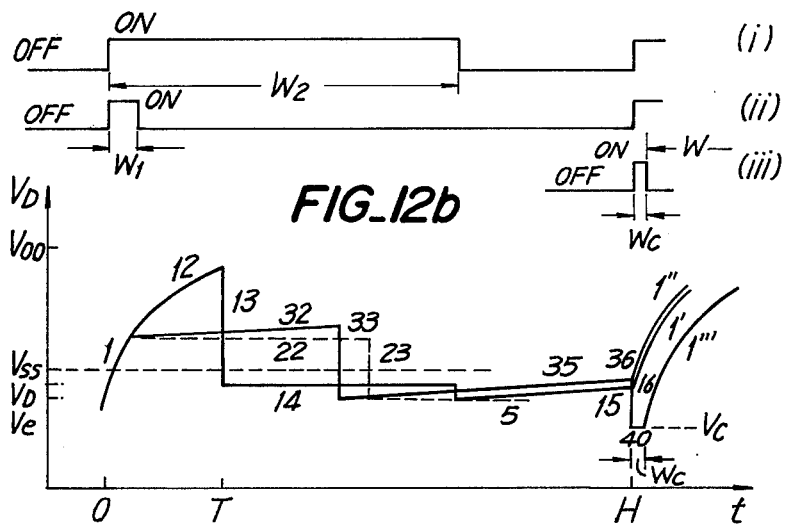
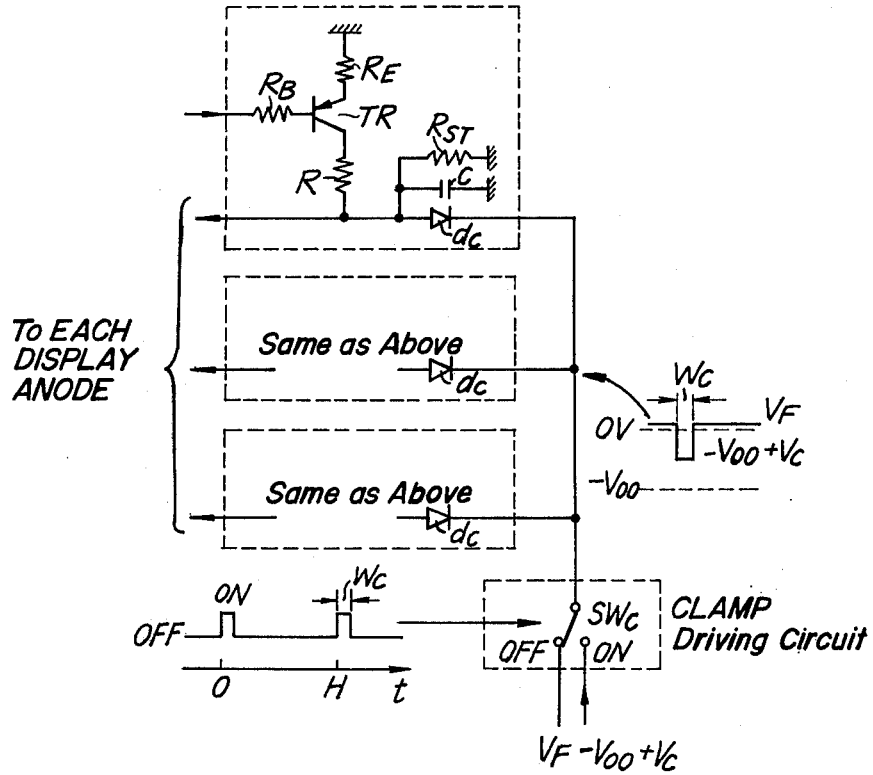

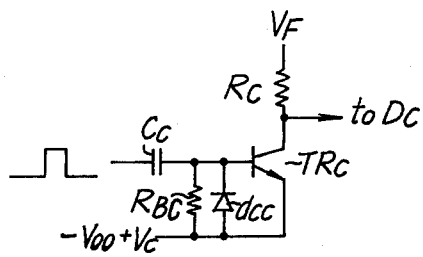
FIG_14a
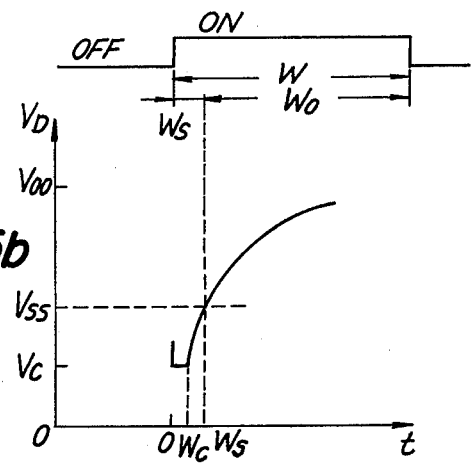
FIG_15a
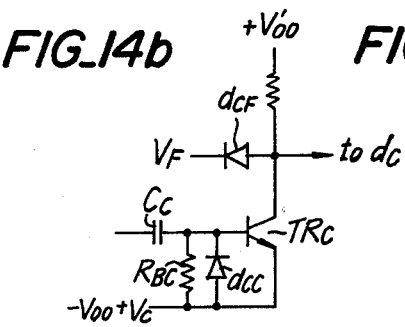
FIG_14b
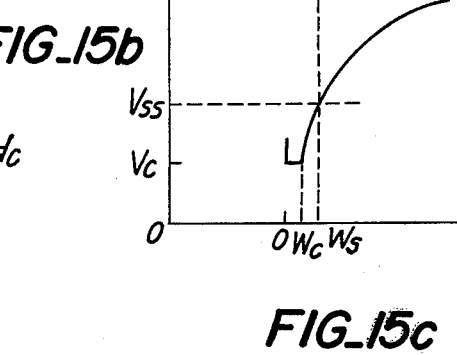
FIG_15b
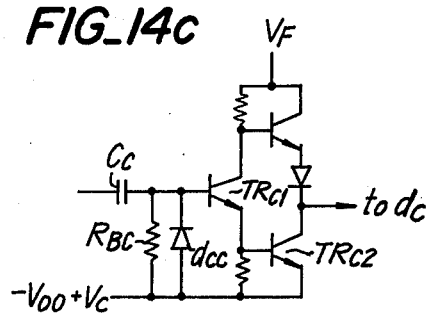
FIG_14c
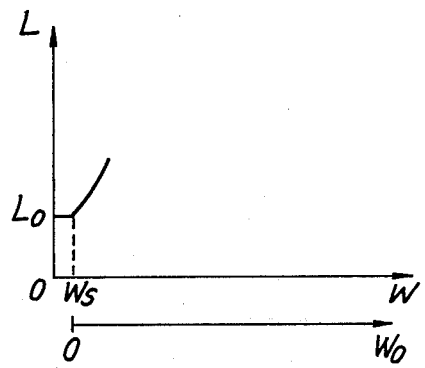
FIG_15c
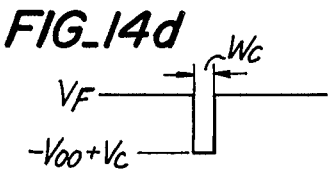
FIG_14d

FIG_16
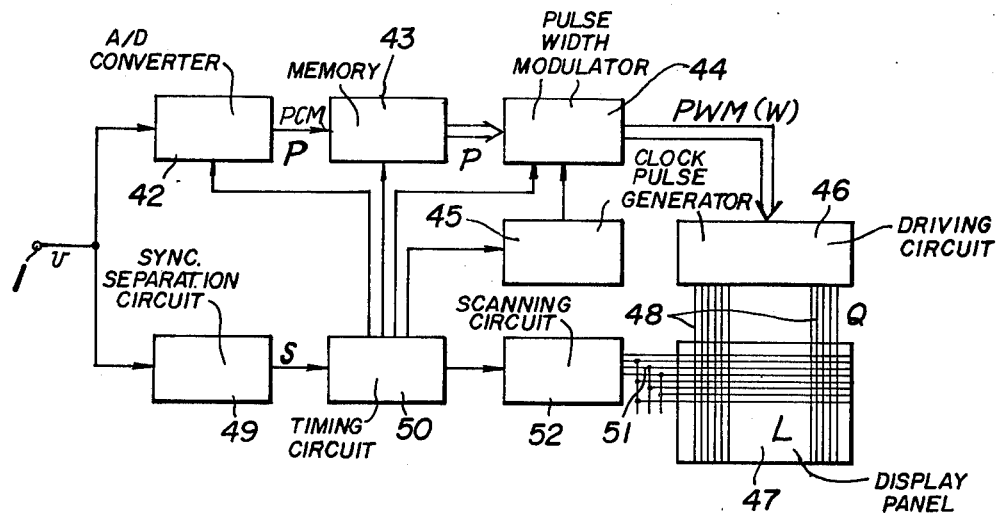
FIG_17
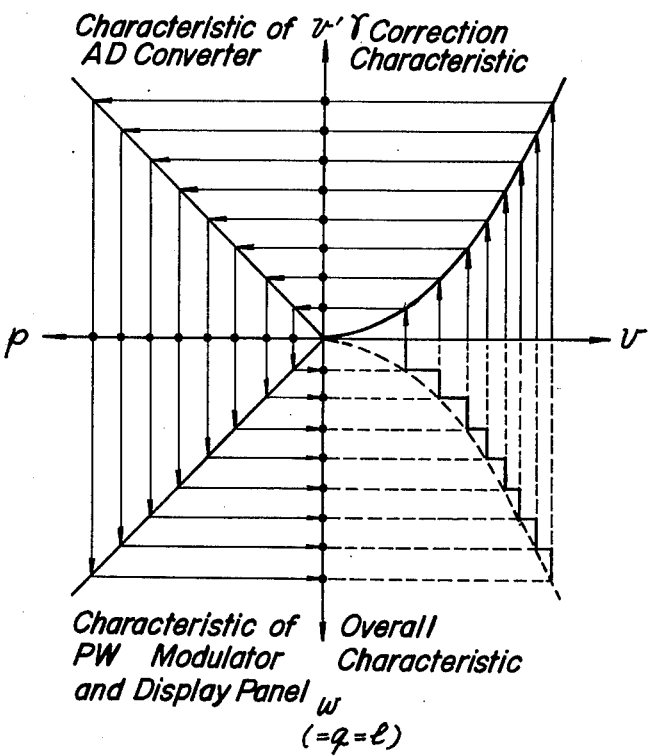

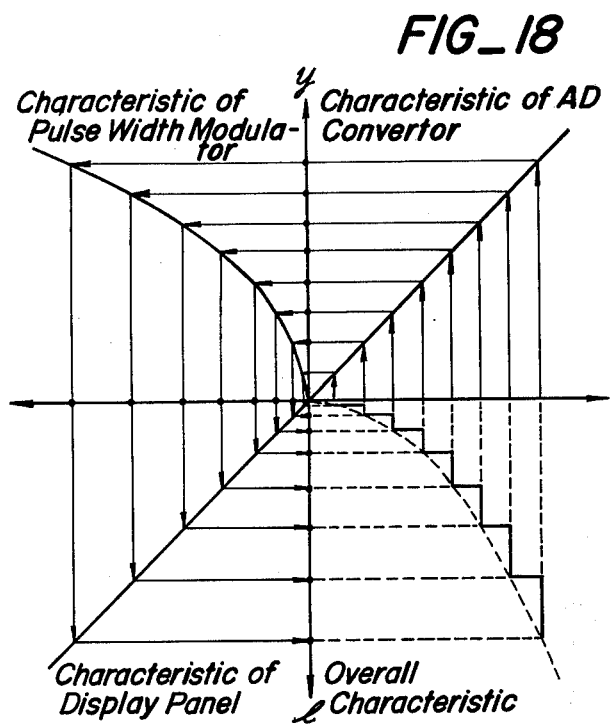
FIG_18
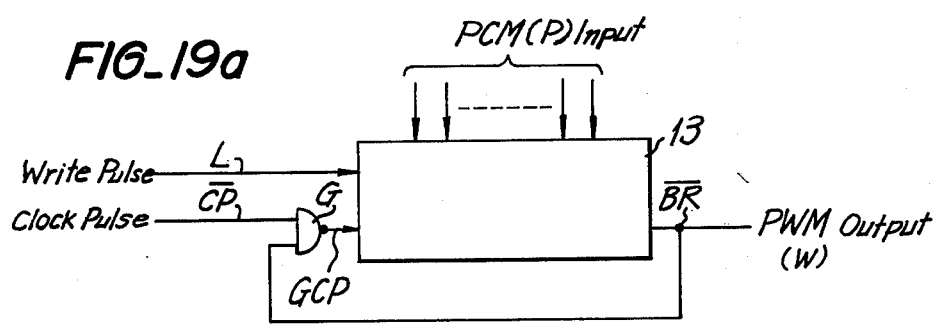
FIG_19a
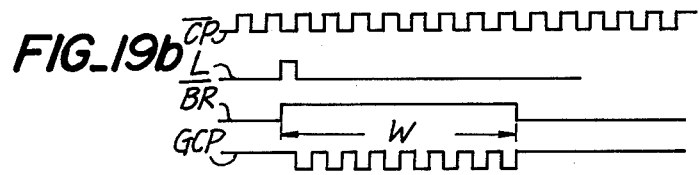
FIG_19b

FIG_20
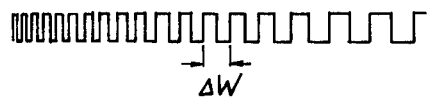
FIG_21
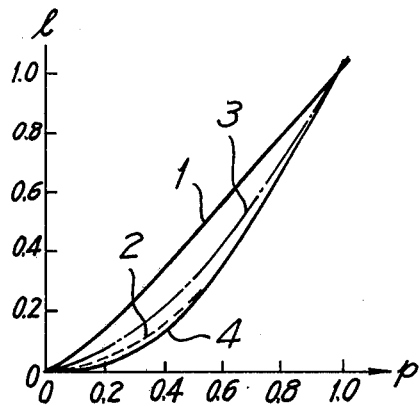
FIG_22
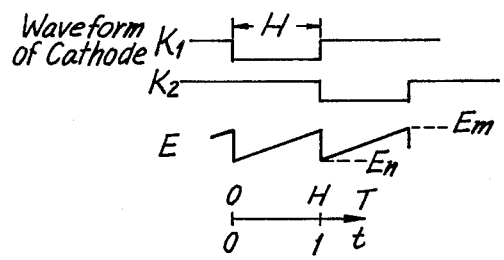
FIG_23a
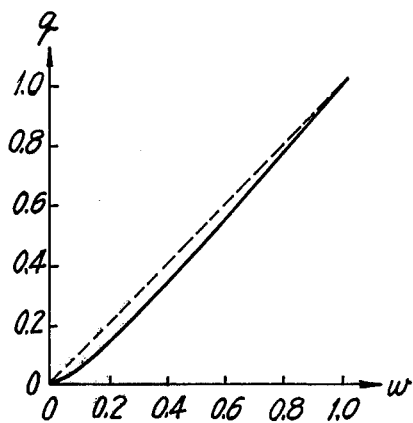
FIG_23b
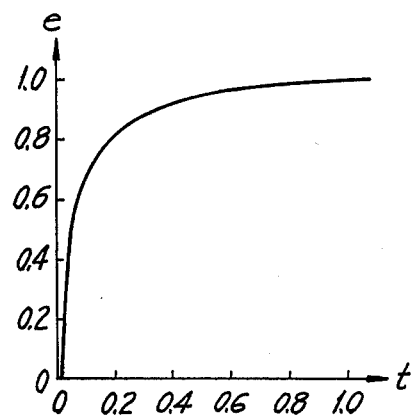

PULSE WIDTH LUMINANCE MODULATION SYSTEM FOR A DC GAS DISCHARGE DISPLAY PANEL

BACKGROUND OF THE INVENTION

1. Field of the Invention:

The present invention relates to a pulse width luminance modulation system for the display of a picture including half tone scenery on a dc gas discharge display panel having a working time lag.

2. Description of the Prior Art:

When a gas discharge display panel is used for a picture display, the operation time allotted for each discharge cell forming the display panel is generally limited to a certain value. In the following explanation this certain value is defined by H. The operation time used herein means to include the discharge duration of a discharge cell for making a continuous glow discharge and a preparatory time between application of the operation voltage to the discharge cell and the commencement of the discharge. As an example, we say consider a case of picture display by an NTSC standard television signal, in which all unit discharge cells forming one row of the discharge panel are excited simultaneously and the display panel is scanned vertically at a rate synchronized with the horizontal scanning period $H_{TV}$ of the NTSC television signal. In this case, an allowable operation time for one unit discharge cell is given by the following.

$$H = H_{TV} = 63.56 \, \mu s$$

Generally, there is a time lag, i.e., a working time lag, in a discharge phenomenon after application of the operation voltage and before starting the continuous glow discharge. Such time lag shows substantial deviation. However, when the discharge cell is supplied with charged particles from others as is the case of the so-called self-scan type panel, the deviation of said time lag decreases considerably and at the same time the breakdown voltage causing breakdown discharge in the gas decreases and it tends to approach the glow discharge voltage, which is maintained during the successive discharge period. The luminance modulation system according to the present invention is mainly concerned with a gas discharge display panel of the type in which charged particles are supplied by some means before starting the discharge.

In the conventional pulse width luminance modulation system in which the discharge time after starting the discharge is modulated, the pulse width W of the driving pulse should be larger than the time lag T before the starting of the glow discharge. By assuming that the time other than the time lag for starting the discharge consists of the discharge duration (W-T), the pulse width W should be modulated in a following range:

$$0 \leq W \leq H-T$$

On the other hand, the maximum value $I_{max}$ of the discharge current is decided by the construction of the discharge cell, composition of the gas, pressure of the gas, etc. and it can not be made larger. Therefore, a highest brightness of the luminance is given by:

$$I_{max}(H-T)fv$$

This luminance value can not be made higher and fv is the repetition frequency of radiation of a discharge cell. In the abovementioned embodiment of the NTSC television signal, the value fv corresponds to the field frequency of about 60 Hz.

As explained above, there is a certain maximum limit for the brightness obtained by a discharge cell. Accordingly, in order to obtain a large contrast ratio, it is required to give an ability to display luminance as small as possible. However, the brighness of the discharge luminance does not decrease in proportion to the ratio of shortening of the discharge time. This is also applied to a case when the driving voltage is discontinued immediately after the commencement of the discharge, in which the discharge time (W-T) is nearly equal to 0. By this reason a desireable sufficient contrast ratio has been difficult to obtain only by applying a conventional pulse width luminance modulation.

SUMMARY OF THE INVENTION

In view of the foregoing, the object of the present invention is to realize a pulse width luminance modulation system able to improve the contrast ratio of brightness of the luminance, in which a normal pulse width luminance modulation is effected for controlling duration of glow discharge in a range of $W \geq T$, and in a range of $W<T$ the luminance intensity is modulated by charges stored in a capacitor so that the dark level to be displayed may be lowered by about one order.

The pulse width luminance modulation system according to the present invention for making a picture display on a gas discharge display panel comprises a means for converting an input picture signal into a constant amplitude pulse width modulation signal representing instantaneous amplitude thereof, a discharge driving circuit, which displays a lower luminance range picture by causing instantaneous radiation for the discharge cell in proportion to a pulse width of the constant amplitude pulse width modulation signal when the relevant pulse width is narrower than a certain value, and in which the circuit displays an intermediate luminance range picture and higher luminance range picture when said pulse width is wider than said certain value by causing glow discharge for the discharge cell, wherein the discharge driving circuit includes a time constant circuit, and said time constant is so selected that the pulse width to luminance characteristic in both the instantaneous luminance and the glow discharge of the discharge cell appears to be continuous and thus the contrast of the luminance in the displayed picture may be increased.

BRIEF DESCRIPTION OF THE DRAWINGS

FIGS. 1a and 1b show circuit diagrams of conventional discharge cell driving circuits;

FIGS. 2a, 2b, 3a, and 3b are waveforms for explaining the operation of such known discharge cell driving circuits;

FIG. 4 is a voltage-current characteristic curve of a discharge tube;

FIGS. 5a and 5b show two embodiments of discharge cell driving circuits according to the present invention;

FIGS. 6a, 6b and 6c are signal waveform diagrams at various portions of said circuits for explaining the operation of the same;

FIG. 7 is an explanatory diagram of luminance modulation characteristics of the system of the present invention;

FIG. 8 is a circuit diagram of a modified embodiment of a series switch type driving circuit according to the present invention;

FIG. 9a is a circuit diagram of one embodiment of the driving circuit for a self-scan type display panel made according to the present invention;

FIG. 9b is a signal waveform diagram for explaining the operation of the circuit shown in FIG. 9a;

FIG. 10 is a characteristic diagram for explaining the luminance modulation characteristic of the same;

FIG. 11 is a circuit diagram showing one embodiment of a parallel switch type driving circuit according to the present invention;

FIGS. 12a and 12b are waveform diagrams when the holding effect is insufficient;

FIG. 13 is a circuit diagram of a driving circuit according to the present invention in which a clamp circuit is added;

FIGS. 14a to 14c are embodiments of said clamp circuit;

FIG. 14d is a waveform diagram for explaining operation of the clamp circuit;

FIG. 15a to 15c are signal waveforms for explaining the effect of the clamp circuit for the luminance modulation characteristics;

FIG. 16 is a block diagram for showing an embodiment of a $d_c$ discharge display device;

FIG. 17 is a characteristic diagram for showing reproduced tones of picture when the input image signal had been previously applied with $\gamma$ correction in the preceding stage of the AD converter in the display device shown in FIG. 16;

FIG. 18 is a reproduced tone characteristic curve when the $\gamma$ correction is given at the pulse width modulator;

FIG. 19a is a block diagram for showing one embodiment of the pulse width modulator shown in FIG. 16;

FIG. 19b is a time chart for explaining the operation of the modulator shown in FIG. 19a;

FIG. 20 is a waveform diagram of a clock pulse used in the modulator shown in FIG. 19a;

FIG. 21 is a conversion characteristic diagram of a pulse code modulated input image signal $y$ and luminance signal $z$ of the display panel;

FIG. 22 is a waveform diagram for showing the relation between the cathode voltage and source voltage; and FIGS. 23a and 23b are curves for showing conversion characteristics and a corrected waveform obtained by $\gamma$ correction of another type.

DESCRIPTION OF THE PREFERRED EMBODIMENT

In order to give a clear understanding of the present invention, a general operation of a discharge cell will be explained. Referring to a known circuit shown in FIG. 1a, in which a discharge cell D is applied with a driving voltage $V_0$ through a discharge current limiting resistor R, at first a case of application of a $d_c$ voltage $V_{00}$ for the driving voltage $V_0$ after an instance $t=0$ is considered. FIG. 2a is a waveform of the driving voltage $V_0$ and FIG. 2b is a waveform of the voltage $V_D$ across the discharge cell D. In FIG. 2b, waveform 1 corresponds to a case $V_{00}=V_{001}$ and the discharge is started at an instance after $T_{01}$ of the application of the voltage. The voltage $V_D$ is maintained at the glow voltage $V_d$ after the instance $T_{01}$. Assuming that the minimum voltage for starting the discharge is $V_{ss}$, an applied voltage exceeding the voltage $V_{ss}$, namely $\Delta V = V_{00} - V_{ss}$ ($>0$) is termed as over voltage. As shown by waveforms 2 and 3 in FIG. 2b, if the over voltage is increased, the time lag T before starting discharge will decreases accordingly as shown by $T_{02}$ and $T_{03}$. Generally speaking as a first grade assumption the following relationship is considered:

$$\Delta V \cdot T_0 = S \text{ (constant)}$$

Herein, $T_0$ is the time lag when $V_D$ is a step function.

Then a case as shown in FIG. 1b in which a capacitor C is provided so that the time constant becomes $\tau = R \cdot C$ is considered. The driving voltage in this case is assumed to be as shown in FIG. 3a, which is identical with that shown in FIG. 2a. Only the difference in this circuit is that the value of resistor R is selected not to cause a relaxation oscillation in the circuit shown in FIG. 1b.

Generally a voltage ($V_D$) to current ($I_D$) characteristic curve of a discharge tube is as shown in FIG. 4. As is well known in the art, the adjacent area of point 1 is the Townsend discharge area, the area between points 1, 2 is the transition region, the area between points 2, 3 is the normal glow region, and the area between points 3, 4 is abnormal glow area and the operation point of the discharge tube is given by cross points of load lines originating from the source voltage $V_{00}$ and the discharge characteristic curve. For instance, in a case of $R=R_1$, a cross point 6 is situated in a range of negative grade of the discharge characteristics and this is a cause of the relaxation oxcillation. However, in a driving circuit of a display panel, it is usual to select a point located the upper limit of the normal glow discharge range or a point located in a range slightly shifted into the abnormal glow discharge range, as the operation point in order to obtain a higher maximum luminance. For instance, point 7 or point 8 in FIG. 4 may usually be selected as the operation point. Furthermore, in the pulse width luminance modulation system, the operation point is fixed during the discharge period except for the starting of the discharge. By the above reason it may be assumed without objection that the relaxation oscillation will not occur in a range for which the present invention is applied. Even selecting the operation point in the above range, weak oscillations may appear in superposition, however, these oscillations will not affect the system in practice.

By referring to FIG. 1b, the terminal voltage $V_D$ of the discharge cell D will increase according to a formula:

$$V_{00}[1 - e^{-(t/\tau)}]$$

Several examples of such voltage increase are shown in FIG. 3b by curves 11, 21 and 31. A point 12, 22, or 32, i.e. at time $t=T_1$, $T_2$ or $T_3$, respective discharge is effected. The abovementioned S ($=\Delta V \cdot T_0$) is for instance the portion attached with hatches in FIG. 2b for the curve 2, when $V_{00}=V_{002}$. This is also applied in the case of FIG. 3b. In FIG. 3b, the discharge time $T_i$ ($i=1, 2 \ldots$) is so dicided that an area in each waveform exceeding the value $V_{ss}$ becomes equal with each other. In the case of FIG. 3b, contrary to the case of FIG. 2b, by increasing $\tau$ as $\tau_1$, $\tau_2$, $\tau_3$ ($\tau = R \cdot C$), the discharge breakdown voltage $V_s$ decreases as $V_{s1}$, $V_{s2}$, $V_{s3}$ although the value $V_{00}$ is constant. On the other hand the time lag T increases as shown by $R_1$, $T_2$, $T_3$.

The present invention is to utilize the phenomenon that a discharge can be started at a low excess voltage when the excess voltage is applied with a longer time for the display of low luminance intensity.

In the usual pulse width luminance modulation, the glow discharge time is modulated so that the pulse width W of the driving pulse is larger than the delay time. On the contrary, in the present invention, the range up to $W<T$ is used in order to obtain a lower minimum luminance.

FIGS. 5a and 5b show simplified circuits for explaining the principle of the driving circuits according to the present invention for obtaining lower minimum luminance. FIGS. 6a, 6b and 6c show waveforms at various portions of the above circuits.

The circuit shown in FIG. 5a is termed as a series switch type driving circuit and the circuit shown in FIG. 5b is termed as a parallel switch type driving circuit. In FIGS. 5a and 5b, SW is an electronic switch for instance made of a switching transistor and is driven by a pluse indicated in the drawing. The discharge cell D and the capacitor C are driven when the electronic switch SW is ON in the circuit of FIG. 5a and when the electronic switch SW is OFF in the circuit of FIG. 5b. When the driving time W is in a range of $W<T$, the charge stored in condenser C during the driving period W is maintained after the termination of the driving period W since in the circuit of FIG. 5a the circuit is isolated by the electronic switch SW and in the circuit of FIG. 5b a diode d is counter biased by the driving voltage. When the driving duration W is in a range of $W > T$, the operation is the same as that of FIG. 1b and the glow discharge is made during a period of $W-T$.

Hereinafter, a more detailed explanation for the operation of the driving circuit according to the present invention is given by referring to FIGS. 6a, 6b and 6c. The explanation given herein is with respect to the driving circuit as illustrated in FIG. 5a. However, the same explanation can be applied to the case of FIG. 5b by only changing ON of the electronic switch SW in FIG. 5a as OFF of the same in FIG. 5b.

FIG. 6a is a diagram for showing the operation of the series switch SW in FIG. 5a. FIG. 6b indicates terminal voltage $V_D$ of the discharge cell D. FIG. 6c indicates a waveform of the luminance obtained by the discharge. In the FIGS. 6a and 6c, a curve designated by (i) is a case when $W>T$ and a curve designated by (ii) is a case when $W<T$.

When the circuit is driven by a pulse having the pulse width $W>T$ as is the case illustrated in FIG. 6a curve (i), the voltage $V_D$ will assume a waveform as indicated in FIG. 6b by a curve 1-12-13-14-5 depending on the time constant $\tau=R\cdot C$ and the glow discharge is made in the curve portion 14. This operation is the same as the normally considered pulse width luminance modulation. The curve portion 5 is for holding the glow extinction voltage $V_e$. During the glow discharge period, the terminal voltage of the capacitor C is maintained equal to the flow voltage $V_d$, but after the termination of the driving the discharge current is supplied for a short period and discharge is discontinued at a time when the voltage is lowered to $V_e$ and then this voltage $V_e$ is maintained. By the discharge during period 14 an irradiation as shown by a waveform in FIG. 6a-(i) is obtained.

When the driving pulse has a width $W<T$ as shown in FIG. 6a-(ii), the voltage $V_D$ will assume a curve 1-22-23-5. Namely, at first the voltage raises along the curve 1, then at a point A the driving is terminated so that a voltage $V_H$ is held as shown by a horizontal line 22. In this case, if the voltage $V_H$ is higher than $V_{ss}$, i.e. $V_H>V_{ss}$, then the discharge is started after a time lag $T_H$. If we assume that the capacitance of the capacitor C is not extremely large, the voltage $V_D$ decreases to the glow extinction voltage $V_e$ at once as indicated by a vertical line 23 in FIG. 6b. Therefore the irradiation in this case is impulsive as shown by a curve (ii) of FIG. 6c so that a substantially lower value for the mean luminance is obtained. The intensity of the impulsive luminance varies depending on the amount of the excess voltage $V_H-V_{ss}$.

As has become clear by the above description, by using driving circuits according to the present invention as shown in FIGS. 5a and 5b, it is possible to obtain an impulsive discharge (and luminance) operation mode when the pulse width W of the driving pulse is shorter than the time lag T for starting a discharge as shown in FIG. 6c-(ii). This impulsive discharge operation mode is termed as the holding mode hereinafter. If the range of the driving pulse width W is larger than the time lag T, i.e. $W>T$, middle to high luminance display is possible by a glow discharge operation mode as shown in FIG. 6c-(i). This mode is termed as the glow discharge mode hereinafter. It should be noted that the abovementioned two operation modes need not be selected from outside, but the discharge cell operates automatically in either one of the two operation modes.

As has been explained above, according to the present invention, a remarkable widening of the reproduced contrast ratio is possible by a combined use of the driving system to operate in the holding mode in addition to the glow discharge mode conventionally used in the half tone display by a pulse width luminance modulation system. However, in order to obtain an excellent tone reproduction of a picture it is essential that the tones obtained by the two modes must be continuous with each other.

With respect to the continuous tone requirement, two conditions should be satisfied. The first condition is that at the transition of the modes namely at the transition of holding mode to the glow discharge mode or conversely a discontinuity in the reproduced luminance should not occur and the second condition is that the grade of luminance against W is equal in the proximity of the condition $W=T$.

The first condition is satisfied automatically in the circuit shown in FIGS. 5a and 5b. The glow discharge mode is started at first by a breakdown discharge and then the glow discharged is maintained. Therefore, if we consider a small time unit $\Delta W$, the cases of $W=T+\Delta W$ and of $W=T-\Delta W$ have the same phenomena and the difference is that the driving is discontinued immediately after the starting of the discharge and it is discontinued immediately prior to the starting of the discharge. Therefore, there will be no discontinuity in the reproduced luminance in the both modes of operation.

The second condition will be explained by referring to FIG. 7 showing luminance modulation characteristics between the pulse width W and the luminance L. By result of experiments using a self-scan type $d_e$ gas discharge display panel, the luminance modulation characteristics are as shown by the curves 1, 2, 3 in FIG. 7 depending on the value of $\tau$. In FIG. 7, $L_o$ indicates luminance when $W=O$. In the display panel used in the experiment, the discharge of the scanning electrode was seen conceivably from the display electrode side so that the luminance L does not become 0 even at the time $W=0$. This value $L_o$ represents a characteristic of the panel, which is requested to be a sufficiently small value. The luminance modulation characteristics in the glow discharge mode follows the curves 21, 22 and 23 depending upon the value of the discharge current limiting resistance R shown in FIG. 5a of FIG. 5b. In this case $\tau$ is assumed to be constant. In the FIG. 7, a point 12 corresponds to $W=T$. By selecting the value of $\tau$ so that the curve 2 and curve 22 may have the same gradient at point 12, the abovementioned second condition is fulfilled.

The value of resistance R relates directly to the value of maximum luminance $L_{max}$. Therefore this value is so chosen that a maximum discharge current allowed for the discharge cell will flow at the glow discharge time.

The series switch type driving circuit as shown in FIG. 5a can be modified as shown in FIG. 8 by modifying the return path of the condenser C. The waveform of the discharge cell voltage $V_D$ in this circuit is identical with FIG. 6b. However, there is a difference in that the wavefront, i.e. the curve portion 1, 12 of FIG. 6b corresponds to the charging of the condenser C of the circuit shown in FIG. 5a, but to the discharge of the condenser C of the circuit shown in FIG. 8.

The electronic switch SW in FIG. 5 or FIG. 8 may be formed by a known component such as a bipolar transistor or by a field effect transistor. FIG. 9a illustrates a more practical embodiment of a self-scan type display panel driving circuit based on the principle of FIG. 8 and using a bipolar switch for the electronic switch SW. In the circuit of FIG. 8 a positive voltage for instance 250 V to 300 V is used for the source voltage $V_{oo}$. However, in the circuit shown in FIG. 9a, the source voltage is shifted by voltage $-V_{oo}$ and a negative voltage is used for the source voltage. In FIG. 9a, DP generally indicates a self-scan type display panel consisting of anode group DA, cathode group K, and scanning anode group SA and arranged normally in these sequence. The cathode group K is connected in 3 phases except reset cathode $K_R$, for instance, $K_1$, $K_2$, $K_3$ and the like. The scanning anode SA is ground connected through a current limiting resistance $R_s$, and by applying voltage as shown in FIG. 9b to the cathode group K, a discharge can be started from the reset cathode $K_R$ and then shifted successively to the right side in the FIG. 9b by a reason that the source voltage between the scanning anode and cathode of each phase during the period indicated by 1, 2 ... 9 ... becomes $V_{oo}$. In FIG. 9b, $V_B$ is a voltage such that the $V_{oo}-V_B$ becomes lower than glow extinction voltage. By this discharge, the charged particles spread between the display anode and the cathode and thus the discharge starting voltage becomes lower so that only a display anode and a particular cathode may irradiate discharge. In FIG. 9a, a dotted line circle D indicates one discharge cell at the display side. This will apply also in other figures and indicates one discharge cell unit among a plurality of discharge cells.

Respective elements R, C, D in FIG. 9a correspond to element R, C, D in FIG. 8 and a transistor TR in FIG. 9a corresponds to switch SW in FIG. 8. $R_B$ is a base current limiting resistor. In order to let the transistor TR make a perfect switching operation, the emitter resistance $R_E$ in FIG. 9a is made as $R_E=0$ and the resistance $R_B$ is such a value that a sufficiently saturated current will flow through the transistor TR. When the transistor TR is put "ON" simultaneously with the switching, then it is possible to operate the transistor TR under constant current and in this case the emitter resistance $R_E$ is used. In case the transistor TR operates under a constant current, the resistance R can be made as $R=0$. However, it is preferably to use R as a protecting resistor considering a case when the transistor TR breaks.

Furthermore, it is possible to use the transistor TR as a saturation transistor switch and to substitute the resistance R by a two terminal constant current element. In this case, the leakage current when the transistor TR is OFF should be made a sufficiently small value in order that the constant current element shall not act as a constant current element. When such a constant current element is used in the circuit, the wavefront of the terminal voltage of the discharge cell differs from that shown in FIG. 6b, and it shows more linear waveform. However, there is no essential difference for the operation of the present invention.

For the time constant $\tau$, besides the factor R.C, collector output resistance, collector output capacitance, and stray capacitance between collector and earth are to be taken into consideration. However, the essential condition is not the time constant itself, but the continuous characteristic between the glow discharge mode and the holding mode is important.

In FIG. 9a, $R_{ST}$ is a high resistance for stabilizing the discharge. The value of $R_{ST}$ is in an order that the discharge cell will not cause a glow discharge even the voltage $V_{oo}$ is applied between the anode and cathode of the discharge cell through this resistance $R_{ST}$. In the practical display panel, it is difficult to remove static coupling existing between wires of the driving circuit and the display anode. When such wiring is made as short as possible, the influence for the luminance above middle degree may be removed comparatively easily. However, at the low luminance reproduction, mutual influence between wires will not produce a stabilized discharge. When a high resistance $R_{ST}$ is used, the dispersion of charged particles to the discharge cell at the scanning electrode is accelerated although there is no discharge so that a stable low luminance discharge is obtained. However, the luminance $L_o$ at $W=0$ shows a minor increase due to this resistance. The value of the resistance $R_{ST}$ should be so selected that the time constant $R_{ST}C$ is sufficiently larger than H and not to affect the voltage holding effect of the capacitor C during the OFF period of the transistor TR.

One example of the luminance modulation characteristic obtained by the circuit of FIG. 9a according to the present invention is shown in FIG. 10. By referring to FIG. 10 it can be recognized that the constrast ration only by the glow discharge mode in the range of $W=0-128$ $\mu s$ is about 23:1, but it can be improved about 6 times to be 137:1 in the same range by further using the holding mode.

FIG. 11 shows a practical embodiment of a driving circuit made in accordance with the present invention based on the principle of a parallel switch type driving circuit shown in FIG. 5b.

The voltage holding effect of the capacitor C will be explained hereinafter.

Referring back again to FIG. 6b, the portion 22 is waiting the start of discharge in the holding mode, and the portion 5 is waiting for the next start of discharge after completion of discharge both in the holding mode and in the glow discharge mode. As has been explained above, the capacitor C in FIG. 5 should hold a constant voltage both in the portion 22 and portion 5. The problems considered when this holding operation is not complete will be explained by referring to FIGS. 12a and 12b.

Dotted line waveforms 1-22-23-5 and 1-12-13-14-5 shown in FIG. 12b are the same as shown in FIG. 6b indicated by the same reference numbers and showing perfect holding operation.

In the series switch type driving circuit shown in FIG. 5a or FIG. 8, if the leakage current at the time of the OFF condition of the switch SW is not sufficiently small and also if the discharge stabilizing resistance $R_{ST}$ shown in FIG. 9a is not sufficiently large, the holding operation becomes incomplete. For instance, as shown in FIG. 12b, portion 22–23 in the holding mode deviates as 32–33 and that 5 potential after completion of discharge deviates as 35 and holding voltage 5 at the completion of discharge in the glow discharge mode ascends as 15.

In case there is such a tendency of deviation, in the succeeding driving of the discharge cell after $t=H$, the initial value becomes not constant as shown by 16, 36 of FIG. 12b so that the luminance modulation characteristic varies depending on the previous luminance modulation of the discharge cell. In case such phenomenon is unavoidable, it is possible to clamp the terminal voltage of the discharge cell at $V_c$ ($<V_e$) at the starting of the driving of each unit time, i.e. at $t=nH$ ($n=0, 1, 2, \ldots$) such as shown by 40 in FIG. 12b so as to eliminate the effect of previous discharge. The width $W_c$ in the figure indicates the necessary time width for the clamping. In case the clamping is not effected, the voltage waveform deviates as the curves 1', 1'' against curve 1. But by applying such clamping always a constant waveform as shown by a curve 1''' is obtained and the deviation of the luminance modulation characteristic is thus improved.

FIG. 13 shows one practical embodiment of the driving circuit which is the same as FIG. 9a but added with the clamp circuit. The abovementioned display anode driving circuit consisting of respective elements TR, $R_B$, $R_E$, R, C, $R_{ST}$ is added with a diode $d_c$ for clamping and one end of said clamping diode is driven by a clamp driving circuit. The clamp driving circuit is expressed by a switch $SW_c$ in principle and it holds a potential $-V_{00}+V_c$ during the abovementioned clamp period $W_c$ and a potential $V_F$ other than said clamp period $W_c$. The potential $-V_{00}+V_c$ means a voltage at which the terminal voltage of the discharge cell D in FIG. 9a becomes lower than the glow extinction voltage. The potential $V_F$ is 0 or several or several tens positive voltage at which the diode $d_c$ becomes sufficiently OFF.

The clamp driving circuit can be used in common with the clamping diodes $d_c$ provided at each display anode driving circuit. FIG. 13 illustrates a case in which three diodes $d_c$ are used in parallel. However, in practice several ten diodes may be used in parallel. FIGS. 14a–14c illustrate practical embodiments of the clamp driving circuit, in which FIG. 14a is a most popular circuit, and Figs. 14b and 14c are known circuits for decreasing the rising time of the output and for decreasing the output impedance when the output is a high potential. In FIG. 14b, the voltage $V_{00}'$ is a positive voltage higher than the voltage $V_F$ by several tens to 100% of the voltage $V_{00}$. Each input circuit of the FIGS. 14a–14c is shown to include a capacitor $C_c$, a resistor $R_{BC}$, and a diode $d_{cc}$ in order to obtain a desired clamping pulse width at the output by differentiating an input pulse having its pulse width wider than the clamping period $W_c$ by means of the condenser $C_c$ and the base-emitter conducting resistance of the transistor $TR_c$, and furthermore, to use the condenser $C_c$ for the $d_c$ isolation between the $d_c$ potential of the input pulse and $-V_{00}+V_c$. However, it should be noted that such condenser $C_c$, resistor $R_{BC}$, and the diode $d_{cc}$ may be eliminated in case such differentiation or $d_c$ isolation is not required.

The foregoing explanation with respect to FIG. 12b related to a case when a series switch type driving circuit is used. But the waveform will differ slightly when a driving circuit of a parallel switch type such as shown in FIG. 11 has been used. The curve portions 32, 35, 5 in FIG. 12b show ascending characteristics according to the time. In case there is a leaakage current in the diode $d$ in the circuit of FIG. 11, the above curve portions show descending characteristics; contrary to that the resistance $R_{ST}$ will cause ascending characteristics, and as a result a difference between the both effects will appear in the output. The operation is exactly the same with as that of the series switch type driving circuit regarding the fact that such influence can be removed by clamping.

An influence of the clamping to the luminance modulation characteristic will be explained by referring to FIGS. 15a–15c. FIG. 15a shows a waveform of an input pulse to the driving circuit. FIG. 15b shows a waveform of the terminal voltage $V_D$ of the discharge cell. FIG. 15c shows a luminance modulation characteristic. As shown in FIG. 15b, the voltage $V_D$ is clamped at $V_c$ in a range of $0 \leq t \leq W_c$ and ascends after an instant $t=W_c$. If the time of assuming the voltage $V_D$ to $V_{ss}$ is defined by $t-W_s$, the holding voltage $V_H$ in the holding mode becomes $V_H<V_{ss}$ for $W<W_s$ and the discharge is not effected in a range of $0<t<H$. This voltage $V_{ss}$ is a value taking into account that the value $V_H$ ascends during the holding period. Accordingly, the effective modulation pulse width $W_0$ is as indicated in FIG. 15a and is given by $W_0=(W-W_s)$. The luminance modulation characteristic is given by FIG. 15c, and during the period of $0 \leq W \leq W_s$ only the same luminance $L_0$ as that for the value $W=0$ is obtained. Therefore for a very strict requirement a driving pulse width $W=W_s+W_0$, wherein the component $W_0$ in proportion to the signal is previously added a certain width $W_s$, is to be used. However, in case the value of $W_s$ is small, a tone characteristic tolerable in practice may be obtained without carrying such adjustment.

The problem described by referring to various figures in FIGS. 15a–15c is a matter already existing when a clamping is not effected. The waveportion 1 in the curve of FIG. 6b for the period $V_e \leq V_D \leq V_{ss}$ corresponds to a period $W_s$ in FIG. 15b. If the value $V_c$ is substituted by $V_e$ in FIG. 15b same explanation may be applied to FIG. 6b.

Instead of substituting $W_s$ always for $W_0$ it is possible to arrange as the following condition, when a digital pulse width modulation is used and depending on the condition of the modulator:

$W = W_0$ (when, $W_0=0$)

$W = W_s+W_0$ (when, $W_0>0$)

The pulse width W in the luminance modulation characteristic shown in FIG. 10 also includes $W_0$ according to such system as explained above.

In the gas discharge display panel as described above, if there is adopted a pulse width luminance modulation system for modulating a discharge period of each discharge cell in the constitutional unit of the panel, $\gamma$ of a voltage to luminance characteristic for the displaying input signal becomes substantially unity. A television signal of the present standard system, however, aim at a receiver using a CRT (cathode ray tube), and when using the CRT of $\gamma=2-2.2$, correction is made at the transmitter side for obtaining the optimum gradation reproduction. When the gas discharge display panel displays an image by using such television signal as the input, then non-linear correction corresponding to $\gamma$ of the CRT is preferbly carried out in a display device.

FIG. 16 is a block diagram showing the construction of one embodiment of a conventional dc discharge display device. In this embodiment, a line at a time driving system is used, so that the portion indicated by a double-tracked arrow is a parallel circuit with as many a display anode which will be explained later. In FIG. 16, a conventional video signal (voltage V) is supplied to an input terminal 41 as the input, and then coded to a PCM signal (level P, for instance, $0 \leq P \leq 63$ in 6 bit PCM) in an AD converter 42. The coded signal is successively stored in a memory 43 and the contents of the memory 43 are transferred to a pulse width modulator 44 in parallel at every vertical scanning period (cathode on time) H. The pulse width modulator 44 consisting of, for example, a preset counter for as many display electrodes as there are, is so constructed that a PWM pulse (width W) is obtained by counting clock pulses from a clock pulse generator 45 for the number being set, and luminance L is obtained by driving a display electrode 48 of a display 47 through a display electrode driving circuit 46.

In this case, assuming that charge consumed in one discharge, i.e., charge consumed by one discharge cell in the H period, is Q, and the time is expressed by T, it is defined by $$Q = \int_0^W I dT,$$

wherein I is an instantaneous value of the discharge current. Assuming that a variable normalized maximum value of the above variable by 1 is expressed by a small character, the time T is defined within the range of $0 \leq T \leq H$ and becomes $t = T/H$.

Timing for controlling the AD converter 42, the memory 43, the pulse width modulator 44 and the clock pulse generator 45 is controlled by a timing circuit 50 which is actuated based on a synchronizing signal s obtained by separating the synchronizing signal s form the video signal V of the input in a synchronizing separation circuit 49. This timing circuit 50 also controls timing of scanning of a scanning circuit 52 for scanning a scanning electrode 51 of the display panel 47.

The luminance L in the display panel 47 is shown by a time mean value, and is substituted by a time integral value in the vertical scanning period H of the instantaneous luminance by making a field frequency constant. While the instantaneous luminance is supposed to be proportional to the discharge current I, the luminance L is proportional to the charge Q. If the normalized variable is used, it becomes $l=q$. Then, it is considered that a display electrode driving circuit b outputs the charge Q by using the PWM pulse of the width W as the input. In the usual PWM driving system, the discharge current is maintained at a certain value, so that there is approximately established a relation of $q=w$ by making $I=1$.

As $\gamma$ correction of the digital PWM driving display device, a practical method is that a video signal is $\gamma$ corrected in an analog circuit and the corrected signal is added to the AD converter, or has non-linearity ($\gamma$ characteristic) necessary to the AD converter. For example, in FIG. 16 the input signal V is previously added to a conventional $\gamma$ correction circuit (not shown), and the output V' of this circuit is added to the AD converter 42. In this case, the gradation characteristic of this device becomes as shown in FIG. 17. In FIG. 17, a first quadrant shows the characteristic of a $\gamma$ corrector, a second quadrant indicates the conversion characteristic of the AD converter 42, and a third quadrant shows the conversion characteristic of the pulse width modulator 44. In FIG. 17, there is assumed $z=q=w=p=v'$. That is, the AD converter 42, the pulse width modulator 44, the display electrode driving circuit 46 and the display panel 47 are linearly to be actuated. Accordingly, the $\omega$ axis may be considered as the $l$ axis, and a fourth quadrant shows the overall gradation characteristic of the system shown in FIG. 16. Further, each black point on the axis of FIG. 17 shows a value which each quantized variable can attain.

As is apparent from the overall characteristic shown in the same figure, the luminance $l$ is reproduced at equal intervals over the whole range. However, judging from the point of S/N of a reproduced screen and from the point that the dimension of a discriminating threshold of luminosity as the characteristic of sight is smaller in the bright portion than in the dark portion, it is preferable to quantize the luminance finely in the dark portion but roughly in the bright portion.

In the present invention, such $\gamma$ correction is carried out in a dc discharge display device having a gas discharge display panel with the circuit construction shown in FIG. 16 after PCM coding.

As a means of such $\gamma$ correction, at first there is a method of carrying it out at the pulse width modulator 44 and secondly a method of carrying out it at the display electrode driving circuit 46. FIG. 18 shows a gradation reproducing characteristic when the $\gamma$ correction is carried out by the first method. As is shown in this figure, it is found that a low luminance portion is finely and a high luminance portion is roughly reproduced as compared with FIG. 17. The overall characteristics in the case of carrying out the $\gamma$ correction by the second method is also the same as that of FIG. 18.

In the pulse width modulator 44 composed of the abovementioned preset counter, the clock pulse having a certain frequency is usually counted, but in the first method, there is used the clock pulse the period of which varies in synchronization with the vertical scanning period H (hereinafter referred to as FM clock pulse) and in the second method, the supply voltage used in the display anode driving circuit 46 is varied in synchronization with the vertical scanning period H. Thus the $\gamma$ correction is carried out in both the methods, respectively. When comparing these two methods with each other, the first method has a characteristic that the γ correction is carried out in the digital circuit, exclusive of the portion for generating the FM clock pulse, but has an actual restriction that the change of the period of the FM clock pulse, i.e., the modulation index of FM cannot freely be made large from the circuit technique. The second method has a characteristic that the low luminance may easily be reduced, but has a disadvantage that when the maximum value of the discharge current I is set to the same value as that of the first method, the maximum luminance reduces to about half and consuming power is increased as the number of the display electrode 48 in the display panel 47 is increased, so that handling becomes troublesome.

When considering profits and losses of the above two methods of the γ correction, it is preferable to employ the first method principally and to co-use the second method auxiliary.

As a common characteristic in these two methods, there is mentioned the point of obtaining the γ characteristic with the use of a corrected waveform since non-linearity is finally given to the time integral value L of the instantaneous luminance. As these corrected waveforms, it is preferable to be simple as possible, and in principle or at least approximately, a linear saw-tooth waveform or an exponential saw-tooth waveform is preferable.

The contents roughly explained in the foregoing will be explained in detail hereinafter.

At first, the first γ correcting method, i.e., the γ correction carried out at the pulse width modulator 44 is explained. The pulse width modulator 44 shown in FIG. 16 is one example of conventional pulse width modulators, for providing the pulse width W by using the PCM data Y as the input, and a preset counter 53 shown in FIG. 19a may be used as the modulator. FIG. 19b indicates a time chart showing the operation of this preset counter 53. If a down counter is used as the counter 53 and NOT $\overline{BR}$ of borrow is used as the output, when the state S of the counter is 0, $\overline{BR}$=0 and when S ≠ 0, $\overline{BR}$=1. The $\overline{BR}$ is used for prohibiting the input clock pulse $\overline{CP}$ from the clock pulse generator 45 shown in FIG. 16 at the gate circuit G, so that the circuit shown in FIG. 19a counts during $\overline{BR}$=1 and stops counting at $\overline{BR}$=0. FIG. 19b shows the operation in case of Y=8, in which by firstly presetting S=Y=8 by L the counting operation is started, S is reduced to 8, 7, 6, ... 1, 0 at every rise of the gated clock pulse GCP, and the clock pulse $\overline{CP}$ is prohibited by the gate G when S=0, and the operation is stopped. Accordingly, the width of $\overline{BR}$ is for 8 clock pulses in this embodiment. The clock pulse $\overline{CP}$ shown in FIG. 19b has a certain cycle, so that its p-w transfer characteristic becomes linear as shown in FIG. 17. Said first γ correction method applied to such pulse width modulator 44 is to obtain a non-linear transfer characteristic shown in FIG. 18 by using to said pulse width modulator 44 the clock pulse in which a cycle ΔW shown in FIG. 20 is gradually increased.

In case that the cycle ΔW of the FM clock pulse shown in FIG. 20 is increased by a certain amount, i.e., in case that the Pth cycle is expressed by $\Delta W_P = A + B \cdot P$, the width W of the PWM obtained by counting P pulses is the sum of $\Delta W_o$ to $\Delta W_P$, so that it is clear that it becomes the form of $W = aP^2 + bP + C$.

FIG. 21 shows an actual value of the transfer characteristics from PCM to the luminance of the panel. In this figure a curve 1 is the transfer characteristics when the γ correction is not made and expressed by l=P for the most part. A curve 3 is an example of the actual value when the γ correction is made by the FM clock pulse as described above and it can be approximated by $l=0.77P^2 + 0.22P + 0.01$. A dotted line 2 is a curve of $l=P^2$ for comparison. Thus, the characteristics closing to γ=2 are obtained and such characteristics are sufficient in practice. The reason why the characteristic does not completely coincide with the curve 2 is that a comparatively small value of the FM clock pulse having the ratio $K=\Delta W_{max}/\Delta W_{min}=3$ between the maximum value and the minimum value of ΔW is used. The reason why K=3 is that at first it can be realized by a simple frequency modulator, and secondly if the characteristic of the curve 2 is obtained by the FM clock pulse only, here is required very large K in calculation, and as a result, $\Delta W_{min}$ becomes too small to the direct current discharge.

In case that the characteristic closer to the curve 2 than to the curve 3 shown in FIG. 21 is required, when the second method in the abovementioned two γ correcting methods, i.e., the γ correction in the display anode driving circuit, is co-used as an auxiliary means a desired characteristic can be realized. This correction is carried out by connecting a feedback circuit of the emitter resistor $R_E$ to the supply source of the voltage E instead of +5 V in the driving circuit shown in FIG. 9a, by varying E in synchronization with the vertical scanning cycle H, and by controlling the discharge current I. E can be common to the whole display anode driving circuit and its waveform can be constant regardless of the video signal, so that the correction can comparatively simply be carried out. FIG. 22 shows a time relation between the waveforms of E and the cathode drive signal, wherein the waveform of E is an example thereof. The minimum and maximum values of the supply voltage E are made $E_n$ and $E_m$, respectively. The time constant of the circuit is hereinafter set to have a proportional relation of the discharge current I and E. Further, in the self-scan type display panel, there is also provided a period that the display anode drive does not actuate every switching of the cathode, i.e., a blanking period, but this blanking period does not directly relate to the present invention, so that there is taken no notice thereof.

At first, for the sake of comparison, there is explained the case that the FM clock pulse is not used and the correction is made by the second method only. As shown in FIG. 22, it is assumed that the instant, when the cathode is switched, is made the original point of a time T ($O \leq T \leq H$), and $t = T/H$, $e = E/Em$ and $e_n = E_n/E_m$. If $e$ is a linear saw-tooth wave $e = e_n + (1 - e_n)t$, it is expressed by $i = e$, and it becomes $$q' = \int_0^w i \, dt = \int_0^w e \, dt = (1 - e_n)w^2/2 + e_n w,$$

and if $e_n = 0$ it becomes $$q' = \frac{1}{2} w^2$$

and then the γ correction can be made, wherein q' is a variable in proportion to the charge Q, but an amount of which is not completely normalized. In this case, the maximum value $l'_{max}$ of the luminance defined by $l' = q'$ becomes $l'_{max} = q'(w=1) = 0.5$. On the other hand, if E is a direct current and the γ correction is realized by the FM clock pulse only, it corresponds to $e_n=1$ in the above equation and becomes $l'_{max}=1$. That is, in case that the maximum value of the instantaneous value I of the discharge current is the same, the correction according to the second method reduces the maximum luminance to half as compared with the correction by means of the first method only. Thus, as to the maximum luminance, the correction by the FM clock pulse is advantageous, so that it is preferable to mainly correct with the Fm clock pulse and to auxiliary use the method for varying E.

Next, the transfer characteristics and corrected waveforms required in case of using the second method as an auxiliary correction are explained. It is assumed that the overall gradation characteristic obtained by the first method is made $l=f(v)=f(p)$, wherein the variable of a small character shows that the maximum value of the variable of a large character is normalized to 1. If the overall γ necessary to the display panel is made 2, as a result of co-using the second method thereto, it is necessary to make $l=p^2$, so that $l=q(w)=p^2=k_1\{f^{-1}(w)\}^2$ is obtained, and $q=k_1\{f^{-1}(w)\}^2$ is the transfer characteristic necessary to the driving circuit, wherein $k_1$ is a constant necessary for normalization. The corrected waveform requires relations as follows:

$$q = k_2 \int_0^t i\,dt = k_2 \int_0^t e\,dt$$

and $$e = \frac{k_1}{k_2}\frac{d}{dt}\{f^{-1}(t)\}^2$$

wherein $k_2$ is a constant.

When applying the above to the actual value shown in FIG. 21, the curve 3 may be seen as $f(p)$, and $f(p) = 0.77p^2 + 0.22p + 0.01$ as described above, so that the following is obtained from the above equation.

$$q = 1.3w - 0.33\sqrt{w + 0.006} + 0.03$$

This transfer characteristic is shown in FIG. 23a. e becomes as follows.

$$e = 1.14(1 - 0.13\sqrt{t + 0.006})$$

As a result, it can be found that the corrected waveform as shown in FIG. 23b can be used.

As understood from the above, this corrected waveform is quite similar to the exponential function in the form of $y - e^{-at}$, for instance, $e_1 = 1 - e^{-7.5t}$ is temporarily approximate. Further, $e_2 = \frac{1}{2}\{(1 - e^{-40t}) + (1 - e^{-5t})\}$ is very approximate. These waveforms are simply obtained by an integrating circuit consisting of a resistor and a capacitor. According to the actual measurement, $e_1$ is sufficient as a required approximate value and $e_2$ is not necessary.

In the corrected waveform shown in FIG. 23b, the lowest value is 0, but from the nature of discharge, if the voltage across the discharge cell is not larger than the direct current discharge starting voltage by a certain value, a stable discharge cannot be obtained, so that the waveform of e is actually clipped by the value less than a certain value of the voltage shown in FIG. 23b or superimposed by a small value of the direct current voltage to FIG. 23b as bias.

In addition, as an actual problem, it is necessary to apply a component for compensating the voltage between the base-emitter of the transistor TR shown in FIG. 9 to said bias, and according to the experiment, the bias of 1.5–2 V is preferable.

The curve 4 shown in FIG. 21 indicates the measured value in case that the curve 3 corrected by the FM clock pulse is further corrected by said $e_1$, which almost coincides with $l=p^2$, and it is understood that a desired object is almost attained.

In accordance with the present invention, the dc discharge type display panel produces normal pulse width luminance modulation for controlling the duration of glow discharge of the cell in a range of $W \geq T$, and controls luminance intensity of the irradiation by a charge stored in a capacitor in a range of W<T, and the display panel is able to reproduce a picture having a substantially wider contrast ratio. Accordingly, a great contribution in the quality of improvement of the displayed picture by the gas discharge display panel is expected.

Further, according to the γ correction system of the present invention, when the pulse width luminance modulation is carried out in the direct current discharge display device comprising a matrix type display panel, there is an advantage that a desired γ correction can be carried out by finely reproducing gradation of the dark portion of the reproduced screen without reducing the maximum luminance.

What is claimed is:

1. A pulse width luminance modulation system for controlling the operation of a dc gas discharge display panel having a working time lag, comprising:
    a means for converting an input signal to be displayed into a pulse width modulated signal having a pulse width corresponding to the amplitude of the input signal; and
    a discharge display panel driving circuit means connected to said converter means, including means for producing a low luminance picture range by making instantaneous irradiation from a discharge cell of said display panel having an intensity corresponding to the pulse width of said modulated signal when the pulse width of the pulse width modulated signal is narrower than a certain value corresponding to the working time lag and for producing a middle to high luminance picture range when said pulse width is wider than said certain value by including means for causing the discharge cell to produce glow discharge which is sustained for a duration in proportion to the wider pulse width, and wherein said discharge display panel driving circuit means comprises a time constant circuit, of which the time constant is such that the gradient of the characteristics between the pulse width of the modulated signal and the luminance intensity both for the instantaneous irradiation and the glow discharge are a smooth curve.

2. A pulse width luminance modulation system for a gas discharge display panel according to claim 1, wherein said discharge driving circuit means comprises a switch circuit connected in series to said discharge cell, a condenser connected in parallel to said discharge cell, and a discharge current limiting resistance connected in series with said discharge cell.

3. A pulse width luminance modulation system for a gas discharge display panel according to claim 1, wherein said discharge driving circuit means comprises a clamp driving circuit commonly connected to a plurality of display anodes of said display panel, and a clamping diode individually provided and connected for each one of the display anodes so as to clamp potential of the display anodes to a certain value prior to driving of the discharge cell.

4. A pulse width luminance modulation system for a gas discharge display panel according to claim 1 wherein said means for converting comprises means for changing the input signal to be displayed to a pulse code modulated signal in a manner that the $\gamma$ value of characteristics between the pulse width of said modulated signal and luminance is corrected, and means for changing said pulse code modulated signal to a pulse width modulated signal.

5. A pulse width luminance modulation system for a gas discharge display panel according to claim 4, wherein said means for changing the pulse code modulated signal includes means for generating a clock pulse which is frequency modulated by a frequency synchronized with the scanning frequency of said display panel, and means for modulating said pulse code signal by said clock pulse so as to produce said pulse width modulated signal.

6. A pulse width luminance modulation system for a gas discharge display panel according to claim 4, wherein a source voltage for driving a display anode varies at a frequency synchronized with the scanning frequency of said display panel.

7. A pulse width luminance modulation system for a gas discharge display panel according to claim 1, wherein said discharge driving circuit means comprises a switch circuit connected in parallel to said discharge cell, a condenser connected in parallel to said discharge cell, and a discharge current limiting resistance connected in series with said discharge cell.

8. A pulse width luminance modulation system for a gas discharge display panel according to claim 1 wherein said means for converting comprises means for changing the input signal to be displayed to a pulse code modulated signal, means for changing said pulse code modulated signal to a pulse width modulated signal, and means for correcting the $\gamma$ value of characteristics between the pulse width of said modulated signal and luminance so as to drive the discharge cell by said pulse width modulated signal.

9. A pulse width luminance modulation system for a gas discharge display panel according to claim 1, wherein said time constant circuit is formed of an RC circuit including a series connection of a resistor and a capacitor of which the connection point is coupled to the discharge cell.

* * * * *